INVENTORS.
THOMAS E. ADAMS
RAYMOND F. WOOLF
BY
Agent 3,448,663
DIFFERENTIAL RELIEF VALVE
Thomas E. Adams, Marietta, and Raymond F. Woolf, Smyrna, Ga., assignors to Lockheed Aircraft Corporation, Burbank, Calif.
Filed Mar. 24, 1967, Ser. No. 625,853
Int. Cl. F15b 11/08, 13/04
U.S. Cl. 91—451                    12 Claims

ABSTRACT OF THE DISCLOSURE

A mechanical relief valve to mechanically limit the maximum allowable differential pressure that can exist between two pressure output lines of a hydraulic actuator and including a pair of normally closed spring-biased poppet type relief valves connected in the hydraulic circuit so that pressure applied to one side of the actuator is also applied to the forward side of one poppet valve and the reverse side of the other poppet valve while pressure applied to the other side of the actuator is applied to the forward side of the other poppet valve and the reverse side of the first poppet valve thereby producing a pressure balance on each poppet valve for giving a relative zero reference pressure balance for the entire system. The spring-biased poppet valves are set to produce a maximum allowable pressure differential between the two pressure output lines.

---

Figure 1:
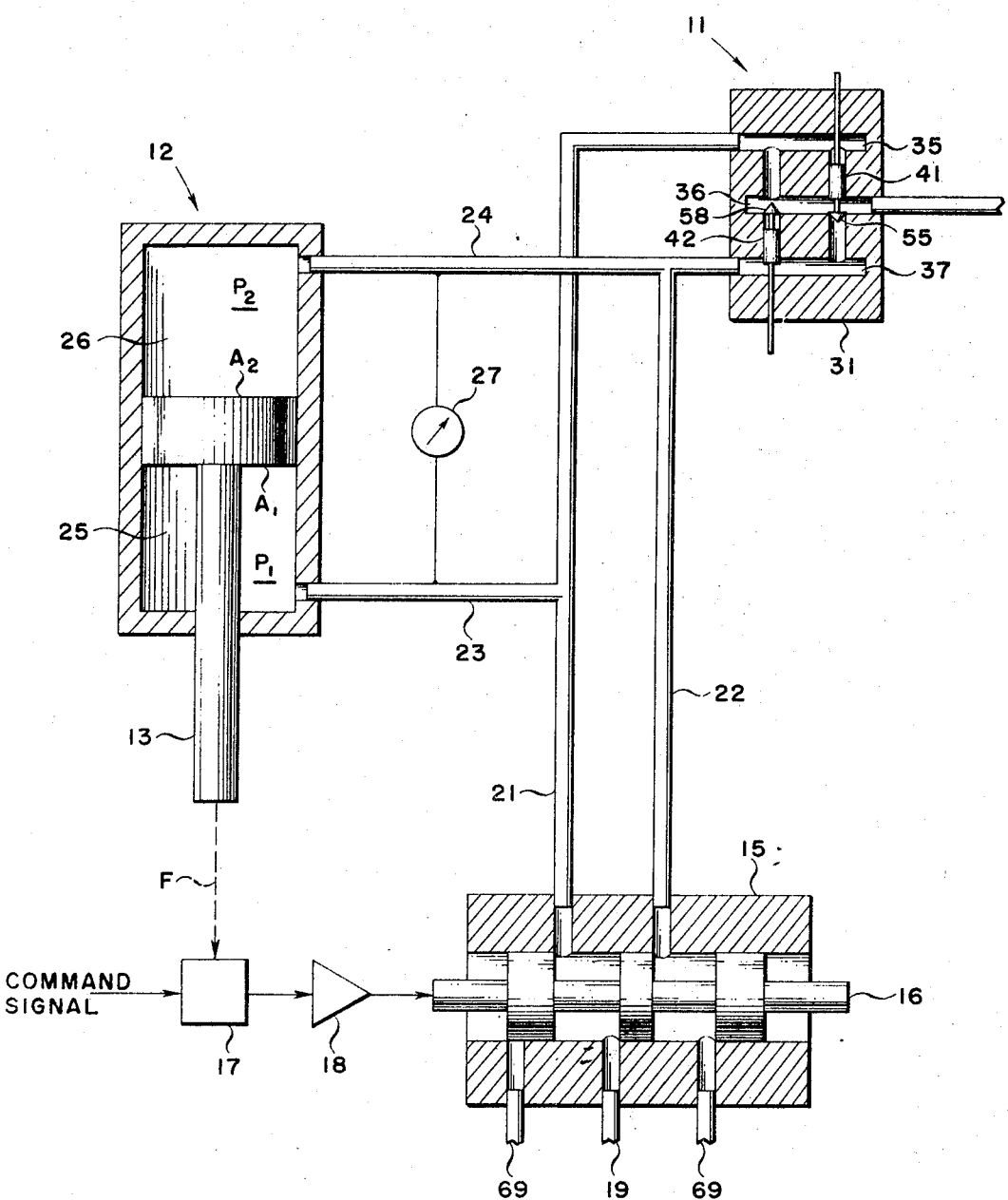

This invention relates in general to pressure valves and more particularly to a differential relief valve for mechanically limiting the maximum allowable differential pressure that can exist between two pressure lines wherein the pressure differential at which the valve automatically functions may be predetermined and preset into the valve.

The present invention is especially designed for use in materials testing and more particularly in the testing of materials such as airframe components. The normal procedure for such materials testing is the use of servo mechanism for controlling hydraulic actuators which in turn apply various forces to the components to be tested. Because of the extreme pressures presented to the airframe components being tested by the hydraulic actuators, it is readily apparent that, if a system malfunction should occur and adequate controls of the hydraulic pressure upon the actuator are not present, then it is quite likely that extensive damage to the airframe components will occur. While in actual practice the servo mechanisms for controlling the hydraulic actuators have a safety feature, normally electrical in nature, such a safety feature cannot always be depended upon to act both dependably and automatically. It is widely known that the electrical safety feature of the normal servo mechanism at times fails due to various problems such as corrosion of the electrical contacts of the safety feature. Therefore, such a safety feature alone cannot be relied upon to provide assurance that the hydraulic actuator will not overload the component being tested. For these reasons, a mechanical safety means is extremely desirable to protect the tested component should a system malfunction occur for whatever reason.

In the utilization of a differential relief valve of the mechanical type as embodied in the present application, a requirement exists wherein, when the hydraulic actuator is changed to a different size, the relief valve mechanism should be easily modified to correspond with the change of size of the actuator. The relationship between the mechanical differential relief valve and the hydraulic actuator to which it monitors is basically one of area ratios in which the ratio of the areas of the normally double acting piston of the hydraulic actuator should be the same as the operating piston areas in the relief valve. By the matching of area ratios between the hydraulic actuator and the differential relief valve, it is seen that the relief valve is completely responsive in operation to the pressures produced by the actuator. This assures complete response of the relief valve to any malfunction in the system which attempts to overload the hydraulic actuator.

Various relief valves have been used in the prior art in the attempt to overcome the problems that are presented when a malfunction occurs in the servo mechanism which control the hydraulic actuator. One of the more prominent prior art devices of this type embodies a spool operation in which the spool reciprocates within a close tolerance housing. However, the spool type valve has a number of major disadvantages. The more important one most probably is that this type of valve is extremely expensive since all surfaces have to be lapped and honed to close tolerances. Further, because of its construction, the spool type valve necessarily does not lend itself to easy interchangeability should the area ratios need to be changed to conform with a different hydraulic actuator being used in the testing procedure. Because of the above noted problems, it is believed that the present invention offers significant advantages and savings over the prior art.

Therefore, an object of the invention is the provision of a pressure relief valve that is functionally applicable in any hydraulic circuit that requires pressure limitation in either a single line or positive and negative differential pressures between two lines.

Another object of the present invention is the provision of a mechanical pressure relief valve in which a set, predetermined pressure differential may be applied to either of two output hydraulic pressure lines to thereby limit the maximum pressure on the hydraulic lines.

Still another object of the present invention is the provision of a relief valve in which the pressure on two hydraulic output lines is balanced hydrostatically against the other and an externally variable spring force whereby the pressure of each line is used to establish a relative zero pressure of the other line.

Yet another object of the invention is the provision of a mechanical differential pressure relief valve utilizing poppet valve construction for simplicity, ease of manufacture and low cost and which allows the poppets to be easily interchanged to match system requirements.

Other object, advantages and capabilities of the invention will become apparent from the following description taken in conjunction with the accompanying drawings showing only a preferred embodiment of the invention.

Figure 2:
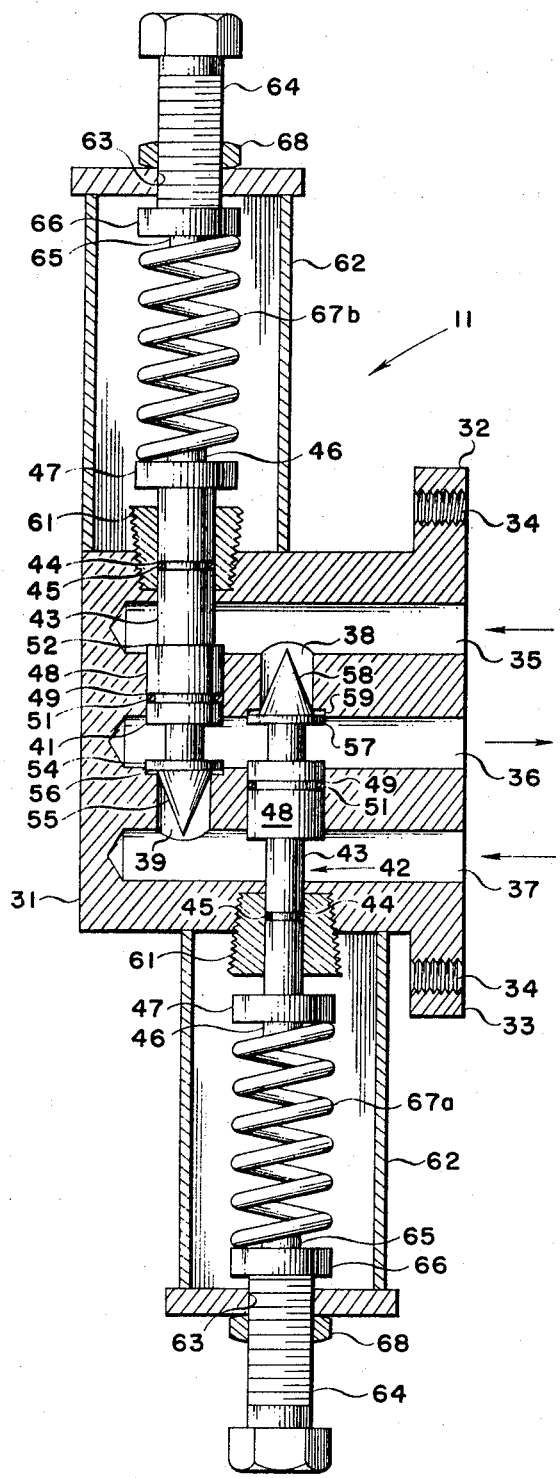

In the drawings:

FIGURE 1 is a schematic representation of a hydraulic system utilizing the differential relief valve of the present invention; and FIGURE 2 is a vertical section view of a specific embodiment of the valve in accordance with the present invention.

Referring to the drawings wherein like reference characters designate corresponding parts throughout the several figures, the differential relief valve of the present invention is generally indicated by the numeral 11. The relief valve 11 is connected into a hydraulic circuit which includes a hydraulic actuator 12 designed to put both compressive and tensive loads upon a test structure by means of the piston rod 13 attached to the actuator piston 14. The hydraulic actuator 12 may be suitably controlled by a servo valve 15 of known design whose reciprocative spool valve assembly 16 is reciprocated in known manner upon receipt of a command signal being fed into the signal integration system 17, and integrated therein with the signal received by action of the piston rod 13 through a load cell (not shown). The final integrated signal is transmitted through the feedback amplifier 18 which then activates the spool valve assembly 16.

In general, the reciprocation of the spool valve assembly 16 allows hydraulic fluid to be supplied through the system pressure line 19 to either of the servo valve hydraulic lines 21 or 22 depending upon the position of the spool valve assembly. The hydraulic pressure will normally be supplied through the tension chamber hydraulic line 23 or the compression chamber hydraulic line 24 to the respective tension chamber 25 or compression chamber 26 of the hydraulic actuator. When the system is in operation, the tension chamber 25 normally has a pressure $P_1$ acting against an area $A_1$ of the actuator piston 14. Likewise, the compression chamber 26 has a pressure $P_2$ acting against area $A_2$ of the actuator piston. The differential of the pressures in the tension chamber and the compression chamber produces a resultant force F which is transmitted by the piston rod 13 wherein this force may be represented by the following equation:

$$F = P_1 A_1 - P_2 A_2$$

The differential of pressure between the tension chamber and the compression chamber of the hydraulic actuator may be conveniently measured, if desired, by differential pressure gauge 27 inserted across the hydraulic lines 23 and 24. As should be noted from FIGURE 1, the differential relief valve 11 always has reflected across it the differential of pressures between the tension chamber 25 and the compression chamber 26 of the hydraulic actuator and it is in accordance with this differential in pressures that the relief valve 11 of the present invention operates.

Referring now specifically to FIGURE 2, the differential relief valve of the present invention is shown to comprise generally a unitary valve body 31 of convenient shape which, in the present embodiment, is shown rectangular wherein at one side of the valve body 31 there is a pair of mounting flanges 32 and 33 each having one or more mounting screw receiving apertures 34 by which the valve 11 is attached to a suitable supporting structure. Projecting inwardly from the exterior of the valve body are three hydraulic fluid ports 35, 36 and 37 which are in planar disposition in that the three ports lie within the same plane. While the preferred embodiment shows ports 35, 36 and 37 in parallel relationship, it should be noted that the ports may be in other configurations and still be within the scope of this invention; the only requirement being that the ports lie in the same plane. Port 35 interconnects the tension chamber 25 of the actuator with the differential valve through hydraulic line 23 while port 37 interconnects the compression chamber 26 of the actuator with the differential valve through line 24. Exhaust port 36, as will be shown, is open to receive fluid from both of the ports 35 and 37 and constitutes a system return means for the hydraulic fluid from either of the ports 35 or 37.

Ports 35 and 36 are interconnected to allow passage of hydraulic fluid at desired times by means of passageway 38. Likewise, ports 37 and 36 are interconnected to allow the passage of hydraulic fluid by means of passageway 39. However, as will be seen, there is no free flow of hydraulic fluid between port 35 and port 37 due to the particular action of the valve, which will later be described.

The valve action of the valve body 31 is accomplished by a pair of poppet valves more particularly designated as compression poppet valve 41 and tension poppet valve 42. The poppet valves 41 and 42 extend inwardly into the valve body 31 from the exterior thereof. Each of the poppet valves extend into the valve body 31 in a plane which is normal to each of the ports 35, 36 and 37 and each poppet valve, in some degree, is in communication with all three ports. However, the poppet valves extend inwardly from opposite sides of the valve body so that the distal end of the compression poppet valve 41 is in communication with the compression port 37, while the distal end of poppet valve 42 is in communication with the tension port 35. In general, each of the poppet valves are of similar construction and comprise a valve stem 43 having an O-ring groove 44 with an associated O-ring 45 positioned near the mid-point of the length of the valve stem. At one end of the valve stem, there is a portion of substantially reduced diameter which forms a boss 46 upon which there is normally placed a spring retaining washer 47. At the end of the valve stem remote from the boss 46 is an enlargement 48 which serves generally two purposes. One purpose is to provide a bearing surface between the poppet valves and the valve body 31 in which the enlargement 48 has an O-ring groove 49 which supports a suitable O-ring 51.

As contemplated in the present invention, each valve stem 43 will be of different diameter so that each enlargement 48 will present to the respective tension port 35 or compression port 37 an area ratio surface, designated by numeral 52 for compression poppet valve 41 and numeral 53 for the tension poppet valve 42, to reflect the same area ratio proportions as shown in the hydraulic actuator, or as may be differently said, the relationship of the pressure in the tension port 35 to the area ratio surface 52 of poppet valve 41 is in the same proportion as the pressure $P_1$ within the hydraulic actuator is to the area $A_1$ of the actuator piston 14. Likewise, the pressure in the compression port 37 has the same relationship to the area ratio surface 53 of tension poppet valve 42 as does the pressure $P_2$ within the hydraulic actuator 12 to area $A_2$ of the actuator piston 14. The effect of these proportional pressures and areas shall be made more clear in the description of operation of the present invention.

At the end of the compression poppet valve 41 which restricts fluid flow from port 37 to port 36 there is positioned a poppet lip 54 and a poppet cone 55. When poppet valve 41 is fully seated in its closed position, the poppet lip 54 firmly rests within the lip seat 56. In a similar manner, tension poppet valve 42 has a poppet lip 57 and a poppet cone 58 so that, when the poppet valve 42 is in its closed position closing off port 35 from the return port 36, poppet lip 57 is firmly seated within lip seat 59.

To maintain a tight seal within the valve body and to provide additional bearing surface, each valve stem is reciprocally mounted within a stem bushing 61 which is fitted in threaded engagement within the respective sidewall of the valve body 31. In order to house the exterior end of the poppet valves and other associated structure to be described herein, the valve body 31 has mounted thereupon a pair of spring housings 62 of generally elongated rectangular configuration having at one end thereof a threaded aperture 63 through which is normally positioned an external adjusting screw 64. Each adjusting screw has a boss portion 65 which engages a spring retaining washer 66 to thereby maintain between the spring retaining washers 47 and 66 a loading spring. Loading spring 67a controls poppet valve 42, while loading spring 67b controls poppet valve 41. As will be readily apparent, the adjusting screws 64 may be run inwardly or outwardly to thereby adjust the compression which the loading springs exert upon each of the poppet valves 41 and 42 respectively. Once a desired setting is applied to either loading spring, a jam nut 68 can then be firmly turned down against the spring housing 62 to maintain the adjusting screw in its desired position.

In operation of the present invention, both FIGURES 1 and 2 will be referred to in the following description. It is normally desired to test a structure, such as an airframe component, by exerting either a compressive or tensive force thereupon by means of a hydraulic actuator 12. In order to so accomplish this fact, a system such as shown by FIGURE 1 may be utilized with the present invention. In such a system, a command signal would be fed to the signal integration system 17 which would then feed a resultant signal to the feedback amplifier 18 which in turn would move the reciprocative spool valve assembly 16 of the servo valve 15 in a manner decreed by the resultant signal from the signal integration system 17. Normally the component to be tested is attached in some manner to the piston rod 13 of the hydraulic actuator which also would utilize a load cell to effectively measure the forces being applied to the test specimen. Since the differential relief valve 11 of the present invention is to be utilized to regulate the maximum allowable pressures in both the tension port 35 and the compressive port 37, which pressures are directly related to the corresponding pressures in the various chambers of the hydraulic actuator, it is necessary to adjust the differential relief valve so that the poppet valves 41 and 42 open to relieve excessive pressures in either of said ports.

In order to set into the differential relief valve the maximum and minimum compressive and tensive forces to be applied to the test specimen, it is necessary to turn down the adjusting screws 64 and adjust each poppet valve for the desired pressures. For instance, assuming a particular maximum desired tensive load is to be put on the test article, it would be necessary to adjust loading spring 67a to prevent the opening of the poppet valve 42 until the predetermined maximum desired pressure is attained. Upon the application of the maximum desired tension pressure applied by the servo valve 15 to the tension chamber 25 of the hydraulic actuator, the same tension force is reflected through hydraulic line 23 to the tension port 35 of the relief valve 11. This pressure is likewise reflected against cone 58 of poppet valve 42.

Because of the fact that the loading spring 67a has been compressed tightly for maximum force, it is exerting a force against the poppet valve 42 far in excess of the pressure in port 35. Therefore, the poppet valve 42 will not open to relieve the excess pressure. Therefore, to set this valve for the maximum allowable tension load on piston rod 13, it is necessary to back off the adjusting screw 64 acting upon the loading spring 67a to a point just where the poppet valve 42 opens to thereby dump the hydraulic fluid contained within port 35 into the system return port 36. When the poppet opens in such a manner, the system is thereby balanced for the desired maximum tensive load to be applied to the test specimen. In balancing the compressive poppet valve 41 against the maximum compressive load to be applied to the test specimen, the situation is merely repeated for the compressive poppet valve 41 by signaling the servo valve to admit the maximum desired compressive force to chamber 26 of the hydraulic actuator 12.

Once the differential relief valve has been adjusted so as to regulate the maximum allowable pressures in each of the ports, the piston rod 13 of the hydraulic actuator is then connected to the test specimen so that the test may begin. At this point, the desired test pressure is sent by command signal to the signal integration system 17 which signals the feedback amplifier 18 to move the reciprocative spool valve assembly 16 to a position which will allow such a desired pressure to be applied to the actuator piston 14, whether it be tensive or compressive. The resultant pressure is additionally measured by the commonly used load cell (not shown) and this pressure reading from the load cell is compared in the signal integration system 17 against the command signal for a proper reading. Should the comparison prove inaccurate, an additional signal is sent to the servo valve to apply either greater or lesser amounts of hydraulic fluid to the proper chamber of the hydraulic actuator so as to optimize the pressure upon the test specimen.

In FIGURE 1 the schematic drawing is indicating a system malfunction from whatever source and shows that the servo valve 15 has been order to move the reciprocative spool valve assembly 16 to a position that allows full system pressure from line 19 to be applied to hydraulic line 21, which is the line supplying pressure to the tension chamber 25 of the hydraulic actuator. As the differential relief valve has previously been adjusted to the maximum tension and compressive forces to be allowed on the present test specimen, which in effect gives the maximum differential pressure allowable, it is obvious that the full line pressure being applied to the tension chamber 25 will reciprocate the piston rod 13 and actuator piston 14 to force the hydraulic fluid in compression chamber 26 without restriction into the system return line 69. This obviously exceeds the allowable differential pressure as measured by gauge 27 and will immediately cause the differential relief valve 11 to operate.

Such operation is to be expected due to the fact that the area ratios as previously described for poppet valves 41 and 42 are in proportion to the area ratios of the actuator piston 14. Therefore, in such an operating condition as just described the full line hydraulic pressure is transmitted through line 23 into port 35 where it impinges against the poppet cone 58 of the poppet valve 42. The same pressure also is reflected upon the area ratio surface 52 of the poppet valve 41 which area ratio is proportional to the area ratio $A_1$ of the actuator piston 14. Since there is little or no pressure being applied through line 24 to the port 37, a substantial differential of pressures exists between lines 23 and 24, which causes the full line pressure now in port 35 to overcome the combination of pressures upon tension poppet valve 42 which normally tend to keep this valve in a closed condition. The pressures which must be overcome are those applied to the area ratio surface 53 due to the pressure in port 37 and the loading of spring 67a. In this case, since there is virtually no pressure in line 24, and consequently virtually none in port 37, the pressure upon cone 58 must be of such magnitude as to overcome only the pressure exerted by the loading spring 67a and whatever value there may be in port 37 acting upon area ratio surface 53. When this is done, the poppet valve 42 reciprocates downwardly allowing the fluid in port 35 to pass through the passage 38 into the system return port 36 to be returned to the system reservoir. As long as the malfunction in the system is maintained, the differential relief valve 11 will continue to dump hydraulic fluid into the system return port 36 since the pressures upon the poppet cone 58 will not be reduced until either the malfunction in the system is cleared or the system is shut down.

Once the malfunction is cleared or once the differential of pressures between lines 23 and 24 is back within acceptable maximum allowable limits, the tension poppet valve 42 will be closed once again upon the urging of loading spring 67a and the additional restoring force caused by a return of pressure in port 37 acting upon the area ratio surface 53. While it should be noted that the poppet valve 42 opened at a set maximum pressure, the valve will not close again until the pressure is reduced below the set pressure because of the valve construction as shown particularly by FIGURE 2. By the provision of poppet lip 57 and lip seat 59 a more circuitous route is formed through which the hydraulic fluid must pass, especially when the poppet valve is near a closed condition, which circuitous route causes additional resistance to the closure of the poppet valve 42 by the oil which is entrained at that particular time within the circuitous route. This construction assures that any malfunction in the system which caused the initial operation of the differential relief valve must be cleared before the system will properly operate once again.

While the present description of operation only referred to a condition in which excessive tensive force is being applied to the hydraulic actuator 12, it should be readily apparent to those skilled in the art that, should an excessive compressive force be applied to the hydraulic actuator, poppet valve 41 would be operative in exactly the same manner as that described for poppet valve 42 with the only difference being that the excessive pressure is being supplied through the respective hydraulic lines and ports which are needed to activate poppet valve 41.

The relief valve described in this disclosure represents a simply constructed, reliable mechanical relief valve having full interchangeability of parts which will limit the maximum differential pressure that can be applied to either of two hydraulic lines of a loading hydraulic actuator normally used in materials testing environments. The relative simplicity of design of the present invention allows substantial savings in costs over valve currently being used and the construction allows for low leakage rates in the valve structure, high reliability and low maintenance costs.

While we have particularly shown and described one particular embodiment of the invention, it is distinctly understood that the invention is not limited thereto, but that modifications may be made within the scope of the invention.

What is claimed is:

1. A pressure relief valve comprising, a valve body having first and second fluid receiving ports in communication with respective first and second hydraulic lines, an exhaust port in the valve body, passage means separately interconnecting each fluid receiving port with the exhaust port, first and second poppet valves being housed in the valve body in a manner to operatively open and close a respective passage means interconnecting a fluid receiving port with the exhaust port, each poppet valve being disposed so that a portion of each poppet valve is in fluid communication with each fluid receiving port, means in the relief valve for hydrostatically balancing the hydraulic lines against one another thereby establishing a relative zero pressure therebetween, means for adjustably biasing the poppet valves closed relative to a predetermined maximum differential of pressure between the fluid receiving ports whereby a departure from the predetermined maximum differential of pressure causes a preselected one of the poppet valves to open and discharge hydraulic fluid into the exhaust port.

2. A pressure relief valve for balancing the pressure on two hydraulic lines against one another to establish a relative zero pressure in the valve comprising, a valve body having first and second fluid receiving ports in communication with respective first and second hydraulic lines, an exhaust port in the valve body, passage means separately interconnecting each fluid receiving port with the exhaust port, first and second poppet valves being housed in the valve body in a manner that each poppet valve operatively opens and closes a respective passage means interconnecting one fluid receiving port with the exhaust port, each poppet valve being in communication with the other fluid receiving port, the poppet valves each having a closure end adapted to normally close the respective passage means against the pressure exerted upon the closure end and having a remote pressure surface lying within the other fluid receiving port responsive to the pressure therein, means for controlling the poppet valves relative to a predetermined maximum differential of pressure between the fluid receiving ports whereby a departure from the predetermined maximum differential of pressure causes a preselected one of the poppet valves to open and discharge hydraulic fluid into the exhaust port.

3. A pressure relief valve according to claim 2 wherein the first and second fluid receiving ports and the exhaust port lie within the same plane, the first and second fluid receiving ports being in flanking relation respective to the exhaust port, the first and second poppet valves lying within the same plane as the fluid receiving ports and the exhaust port.

4. A pressure relief valve according to claim 3 wherein the poppet valves are of elongated generally cylindrical configuration, the closure end being cone configured.

5. A pressure relief valve according to claim 4 wherein each elongated poppet valve has an enlarged medial portion, the medial portion supporting the remote pressure surface, the remote pressure surface being of flat planar configuration normal to the longitudinal axis of the poppet valve.

6. A pressure relief valve according to claim 4 wherein the means for controlling the poppet valves include an adjustable resilient spring which adds to the closure force exerted by the pressure in one port upon the remote pressure surface in said one port whereby the pressure in the other fluid receiving port acting against the closure surface of the respective poppet valve in order to open the valve must be of such a value as to overcome the closure force exerted on the remote pressure surface and the force exerted upon the poppet valve by the resilient spring.

7. The combination with a double acting hydraulic actuator having two variable volume pressure chambers, a reciprocable piston within the hydraulic actuator separating the pressure chambers from one another, each pressure chamber having a hydraulic fluid line to supply operating pressure to the piston, means connected with each hydraulic fluid line for establishing a pressure differential between the pressure chambers of the hydraulic actuator, a relief valve in communication with the pressure chambers of the hydraulic actuator having normally closed valve means adapted to sense the differential of pressure between the pressure chambers, the valve means being operable in response to pressure sensings of the pressure chambers, means to adjustably bias each valve means to limit the pressure differential between the pressure chambers of the hydraulic actuator to a predetermined amount, passage means in the relief valve controlled by the valve means for diverting fluid pressure from the hydraulic actuator at desired times, whereby when said predetermined pressure differential is exceeded, the valve means open in response thereto.

8. A fluid valve comprising, a valve body, first and second fluid receiving ports and a fluid exhaust port located in the valve body, passage means connecting each receiving port with the exhaust port, first and second elongated poppet valves, the poppet valves each having a distal closure end positioned within the valve body and a proximal end positioned exteriorly of the valve body, the distal end of the first poppet valve normally closing the passage means from the first receiving port and the distal end of the second poppet valve normally closing the passage means of the second receiving port, and resilient means attached to the proximal end of each poppet valve to urge the valves to a normally closed state.

9. A fluid valve according to claim 8, wherein the fluid receiving ports are disposed in flanking relationship with respect to the exhaust port, said fluid receiving ports and exhaust port all lying in the same plane, the poppet valves disposed to lie in the plane of the fluid receiving and exhaust ports.

10. A fluid valve according to claim 9, wherein each poppet valve has an intermediate portion having an enlarged planar pressure surface confined within one of the fluid receiving ports.

11. A fluid valve according to claim 10, wherein the enlarged pressure of the first poppet valve lies within the second fluid receiving port and the enlarged pressure surface of the second poppet valve lies within the first fluid receiving port.

12. A method of limiting the differential of pressure to be applied to a double acting piston of a load device having first and second hydraulic pressure lines connected to a relief valve assembly having at least one resiliently biased normally closed poppet valve selectively controlling each hydraulic pressure line to divert a portion of said pressure comprising, adding to the closure force of each respective poppet valve the pressure of the hydraulic pressure line not being controlled by said respective poppet valve to balance each poppet valve hydrostatically against the other, adjusting each poppet valve to automatically open at a maximum allowable pressure reflected upon each respective poppet valve from the respective hydraulic pressure line being controlled thereby, and automatically closing each poppet valve when the pressure drops to a level less than the maximum allowable.

References Cited
UNITED STATES PATENTS

| | | | |
|---|---|---|---|
| 284,504 | 9/1883 | Smullen | 91—451 |
| 3,122,064 | 2/1964 | Douglas | 91—451 X |

JOHN J. CAMBY, *Primary Examiner.*

PO-1050
(5/69)

UNITED STATES PATENT OFFICE
CERTIFICATE OF CORRECTION

Patent No. 3,448,663     Dated  June 10, 1969

Inventor(s) Thomas E. Adams and Raymond F. Woolf

It is certified that error appears in the above-identified patent and that said Letters Patent are hereby corrected as shown below:

In Claim 11, column 8, line 70, that portion reading "pressure of the first poppet valve" should read -- pressure surface of the first poppet valve --.

SIGNED AND
SEALED
SEP 3 0 1969

(SEAL)
Attest:

Edward M. Fletcher, Jr.
Attesting Officer

WILLIAM E. SCHUYLER, JR.
Commissioner of Patents